Figure 1:
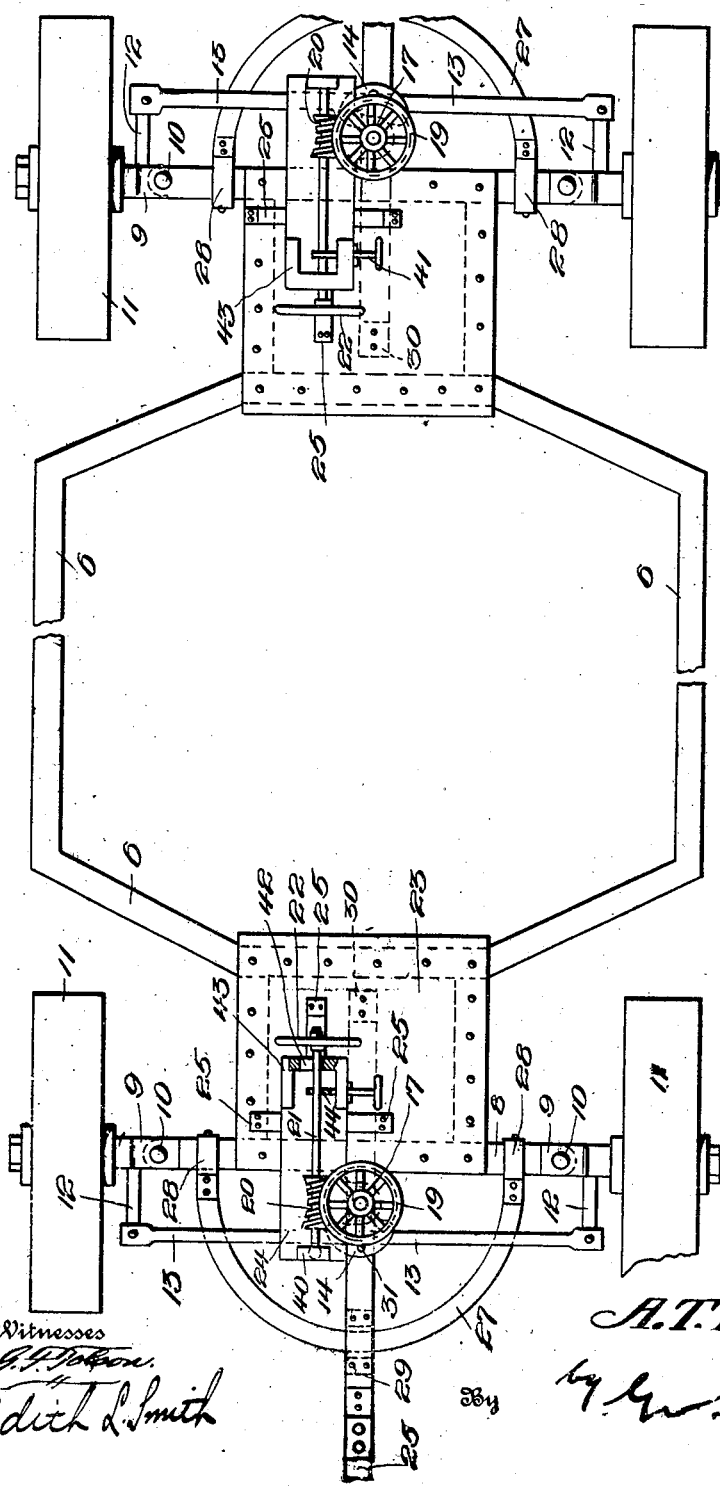

A. T. NEWELL.
STEERING AND RUNNING GEAR FOR WAGONS.
APPLICATION FILED APR. 7, 1910.

992,517.

Patented May 16, 1911.
3 SHEETS—SHEET 1.

Witnesses
Edith L. Smith

Inventor
A. T. Newell.
By
Attorney

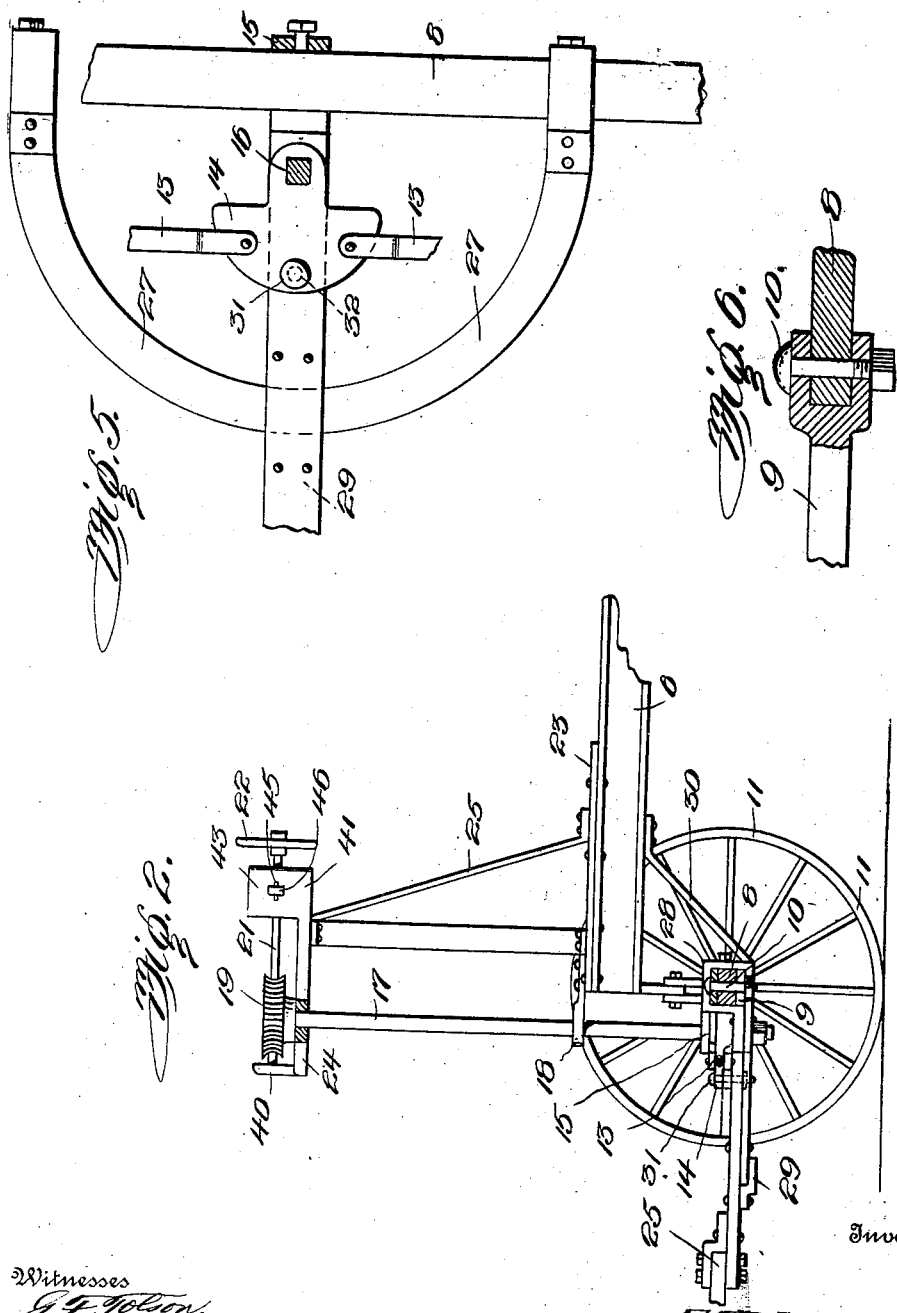

A. T. NEWELL.
STEERING AND RUNNING GEAR FOR WAGONS.
APPLICATION FILED APR. 7, 1910.
992,517.
Patented May 16, 1911.
3 SHEETS—SHEET 3.
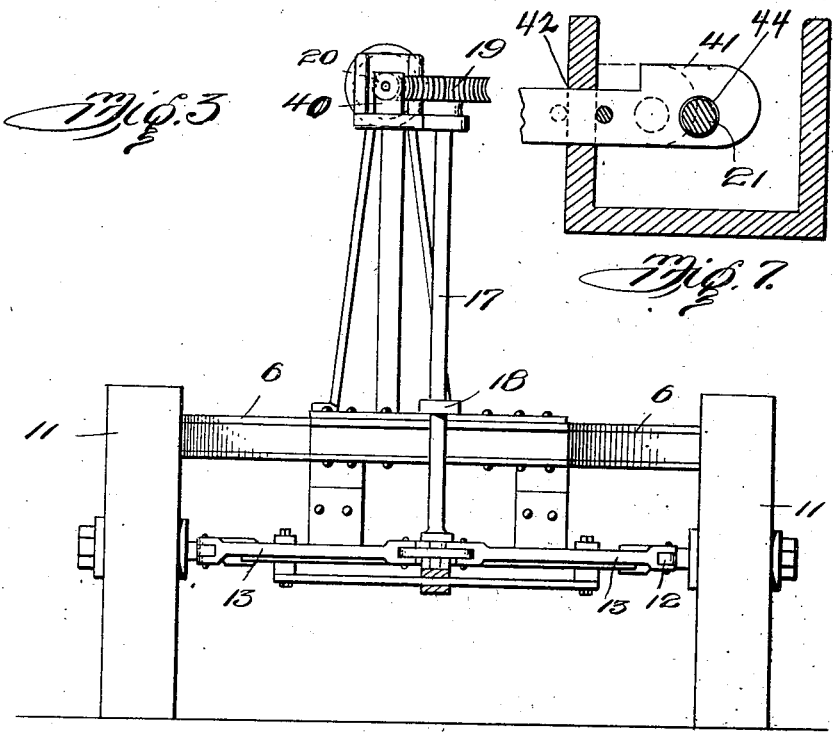
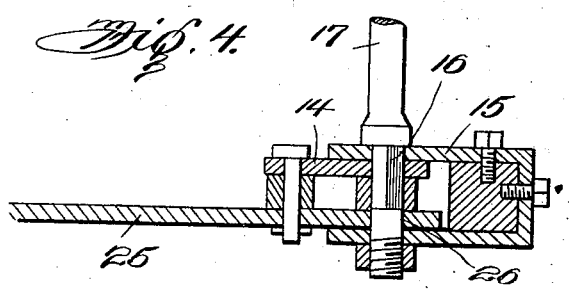
Witnesses
Inventor
A. T. Newell.
By
Attorney

UNITED STATES PATENT OFFICE.

ALFRED T. NEWELL, OF BIRMINGHAM, ALABAMA.

STEERING AND RUNNING GEAR FOR WAGONS.

992,517.  Specification of Letters Patent.  Patented May 16, 1911.

Application filed April 7, 1910. Serial No. 554,054.

*To all whom it may concern:*

Be it known that I, ALFRED T. NEWELL, a citizen of the United States, residing at Birmingham, in the county of Jefferson and State of Alabama, have invented certain new and useful Improvements in Steering and Running Gear for Wagons, of which the following is a specification.

This invention relates to steering and running gear for wagons, and it is particularly adapted for use in connection with dumping wagons, although capable of use on wheeled vehicles of any kind if desired.

An object of the invention is to provide improved means whereby a train of wagons of indefinite length can be hauled, and sharp or short corners can be turned, thereby facilitating the operation of long trains of wagons connected to traction engines.

A further object of the invention is to improve the means whereby a wagon may be steered, comprising in this respect means for operating steering wheels by the tongue, or by hand operated devices mounted on the wagon.

The invention is disclosed in connection with a double ended wagon having steering wheels and devices at both ends, which will be especially useful or necessary in hauling wagon trains. The front end can be connected up so that it will follow the wagon ahead, and the steering wheels at the rear end can be controlled by a man on the wagon, so as to enable the complete train to be drawn along a curved road. Or the draft devices can be disconnected from the steering devices at either or both ends of the vehicle, and the steering at either end controlled by hand. Or the hand operating devices can be disconnected at either or both ends and the steering effected by the tongue.

A further object of the invention is to provide means for transmitting the strain of the draft from the tongue to the frame.

With these and other objects in view an embodiment of the invention is illustrated in the accompanying drawings in which—

Figure 1 is a plan view of a wagon provided with the invention. Fig. 2 is a side elevation thereof partly in section. Fig. 3 is an end elevation. Fig. 4 is a detail of a part of one axle and the steering devices associated therewith. Fig. 5 is a detail in plan of part of the steering devices and the semi-circular draft connection. Figs. 6 and 7 are details in section of parts of the mechanism.

Referring specifically to the drawings, 6 indicates the frame of the wagon, upon which bodies (not shown) of any desired kind may be supported. The construction at both ends of the wagon is the same, and a description of one will answer for both.

The end of the frame is suitably mounted upon an axle 8 at the ends of which are knuckles 9 pivoted at 10 and bearing the wheels 11. Arms 12 project from the knuckles and are connected by links 13 to a crank disk 14. This disk is held between the arms of a bracket or clip 15 which extends around and is fastened to the axle at the middle thereof. The disk is provided with an eccentric squared opening through which extends the squared part 16 at the lower end of an upright shaft 17, partly supported by a bearing bracket 18 at the front of the frame, and having at its upper end a worm gear 19 which is engaged by a worm 20 on a hand shaft 21 which has a hand wheel 22 in convenient position for manipulation by a man on the platform 23 at the front end of the frame. The shafts referred to are mounted in suitable bearings in a supporting plate 24 mounted on legs 25 which stand on the platform.

The pivotal connections between the links 13 and the disk 14 are eccentric, and symmetrically disposed with respect to the shaft 17, so that when said shaft is turned said disk acts as a crank to shift both links 13 in the same direction and turn the steering wheels accordingly. The tongue 25 is loosely connected at its rear end to the shaft 17, the lower end of which extends through a hole in the end of the tongue at 26, and said tongue rests and swings on a half circle bar 27 the opposite ends of which are bent around and thereby fastened to the axle 8, as indicated at 28. The tongue has a clip 29, on the underside, through which the half circle extends, and the arrangement is such that the draft on the tongue is communicated through the clip 29 to the half circle, and thus to the axle, and thence to the frame mainly by means of a brace 30 extending from the axle to the underside of the frame at the front end thereof. The tongue is, however, free to swing on said half circle to a desired extent.

The tongue may be connected to the steer-